(12) United States Patent
Capozzi et al.

(10) Patent No.: US 10,914,318 B2
(45) Date of Patent: Feb. 9, 2021

(54) ENGINE CASING TREATMENT FOR REDUCING CIRCUMFERENTIALLY VARIABLE DISTORTION

(71) Applicant: General Electric Company, Schenectady, NY (US)

(72) Inventors: Joseph Capozzi, North Reading, MA (US); Aspi Rustom Wadia, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/244,559

(22) Filed: Jan. 10, 2019

(65) Prior Publication Data
US 2020/0224675 A1    Jul. 16, 2020

(51) Int. Cl.
| | | |
|---|---|---|
| *F04D 29/52* | (2006.01) | |
| *F02C 3/04* | (2006.01) | |
| *F01D 11/08* | (2006.01) | |

(52) U.S. Cl.
CPC ............ *F04D 29/526* (2013.01); *F01D 11/08* (2013.01); *F02C 3/04* (2013.01)

(58) Field of Classification Search
CPC ........ F01D 5/143; F01D 5/145; F01D 11/001; F01D 11/08; F01D 25/24; F04D 29/403;
(Continued)

(56) References Cited

U.S. PATENT DOCUMENTS 4,239,452 A * 12/1980 Roberts, Jr. ............. F01D 11/12
                                                           415/173.5
5,137,419 A    8/1992 Waterman
(Continued)

FOREIGN PATENT DOCUMENTS

| GB | 2477745 A | 8/2011 |
|---|---|---|
| WO | WO2014/098276 A1 | 6/2014 |
| WO | WO2016/093811 A1 | 6/2016 |

OTHER PUBLICATIONS

Nezym et al., Development of New Casing Treatment Configuration, JSME International Journal Series B Fluids and Thermal Engineering, vol. 47, Issue 4, 2004, pp. 804-881.
(Continued)

*Primary Examiner* — Igor Kershteyn
(74) *Attorney, Agent, or Firm* — Dority & Manning, P.A.

(57) ABSTRACT

A rotary component for a gas turbine engine defining a central axis extending along an axial direction, a radial direction extending perpendicular to the axial direction, and a circumferential direction perpendicular to both the central axis and the radial direction. The rotary component includes a plurality of rotor blades operably coupled to a rotating shaft extending along the central axis and an outer casing arranged exterior to the plurality of rotor blades in the radial direction and defining an annular gap between a tip of each of the plurality of rotor blades and the outer casing. The outer casing includes a plurality of features on an interior surface of the outer casing. A first feature of the feature(s) defines a first casing thickness, and a second feature positioned at least partially circumferentially or axially from the first feature defines a second casing thickness different than the first casing thickness.

20 Claims, 9 Drawing Sheets

(58) Field of Classification Search
CPC ...... F04D 29/526; F04D 29/681; F04D 29/68; F04D 29/2702; F02C 3/04
See application file for complete search history.

(56) References Cited

U.S. PATENT DOCUMENTS

| | | | |
|---|---|---|---|
| 5,308,225 A | 5/1994 | Koff et al. | |
| 5,707,206 A | 1/1998 | Goto et al. | |
| 6,148,518 A | 11/2000 | Weiner et al. | |
| 6,155,778 A | 12/2000 | Lee et al. | |
| 6,231,301 B1 | 5/2001 | Barnett et al. | |
| 6,302,643 B1 | 10/2001 | Kurokawa et al. | |
| 6,435,819 B2* | 8/2002 | Irie | F01D 5/145 415/119 |
| 7,074,006 B1 | 7/2006 | Hathaway et al. | |
| 7,200,999 B2 | 4/2007 | Bagnall et al. | |
| 7,210,905 B2* | 5/2007 | Lapworth | F04D 29/526 415/220 |
| 7,575,412 B2 | 8/2009 | Seitz | |
| 8,251,648 B2 | 8/2012 | Johann | |
| 8,257,022 B2 | 9/2012 | Guemmer | |
| 8,337,146 B2* | 12/2012 | Yu | F01D 11/122 415/119 |
| 8,382,422 B2 | 2/2013 | Guemmer | |
| 8,419,355 B2* | 4/2013 | Guemmer | F04D 29/685 415/170.1 |
| 8,550,768 B2* | 10/2013 | Montgomery | F01D 5/143 415/1 |
| 8,573,946 B2 | 11/2013 | Power et al. | |
| 8,602,720 B2 | 12/2013 | Goswami et al. | |
| 8,777,558 B2* | 7/2014 | Brunet | F04D 29/685 415/58.6 |
| 8,915,699 B2 | 12/2014 | Brignole et al. | |
| 9,551,225 B2 | 1/2017 | Japikse | |
| 9,638,213 B2 | 5/2017 | Obrecht et al. | |
| 9,970,456 B2 | 5/2018 | Japikse | |
| 10,030,539 B2 | 7/2018 | Ronan et al. | |
| 10,046,424 B2 | 8/2018 | Reynolds et al. | |
| 10,047,620 B2* | 8/2018 | Giacche | F04D 29/685 |
| 10,066,640 B2 | 9/2018 | Bennington et al. | |
| 2005/0019152 A1 | 1/2005 | Seitz | |
| 2005/0058541 A1 | 3/2005 | Le Biez et al. | |
| 2008/0044273 A1 | 2/2008 | Khalid | |
| 2010/0329852 A1* | 12/2010 | Brignole | F04D 29/526 415/159 |
| 2012/0201671 A1 | 8/2012 | Shahpar et al. | |
| 2014/0271109 A1 | 9/2014 | Latimer et al. | |
| 2014/0286766 A1 | 9/2014 | Ekanayake et al. | |
| 2016/0153360 A1* | 6/2016 | Jothiprasad | F04D 29/685 60/805 |
| 2016/0153465 A1 | 6/2016 | Yoon et al. | |
| 2016/0169017 A1 | 6/2016 | Giacche et al. | |
| 2016/0178090 A1 | 6/2016 | Schilling | |
| 2017/0328377 A1 | 11/2017 | Mallina et al. | |

OTHER PUBLICATIONS

Muller et al., Effect of Circumferential Grooves on the Aerodynamic Performance of an Axial Single-Stage Transonic Compressor, ASME Proceedings, Turbomachinery, 2007, pp. 115-124.

Wu-Li et al., Numerical and Experimental Investigations of the Flow in a Compressor with Circumferential Grooves, Journal of Aerospace Power, 2006.

Choi et al., Design Optimization of Circumferential Casing Grooves for a Transonic Axial Compressor to Enhance Stall Margin, ASME Proceedings, Turbomachinery, 2010, pp. 687-695.

* cited by examiner

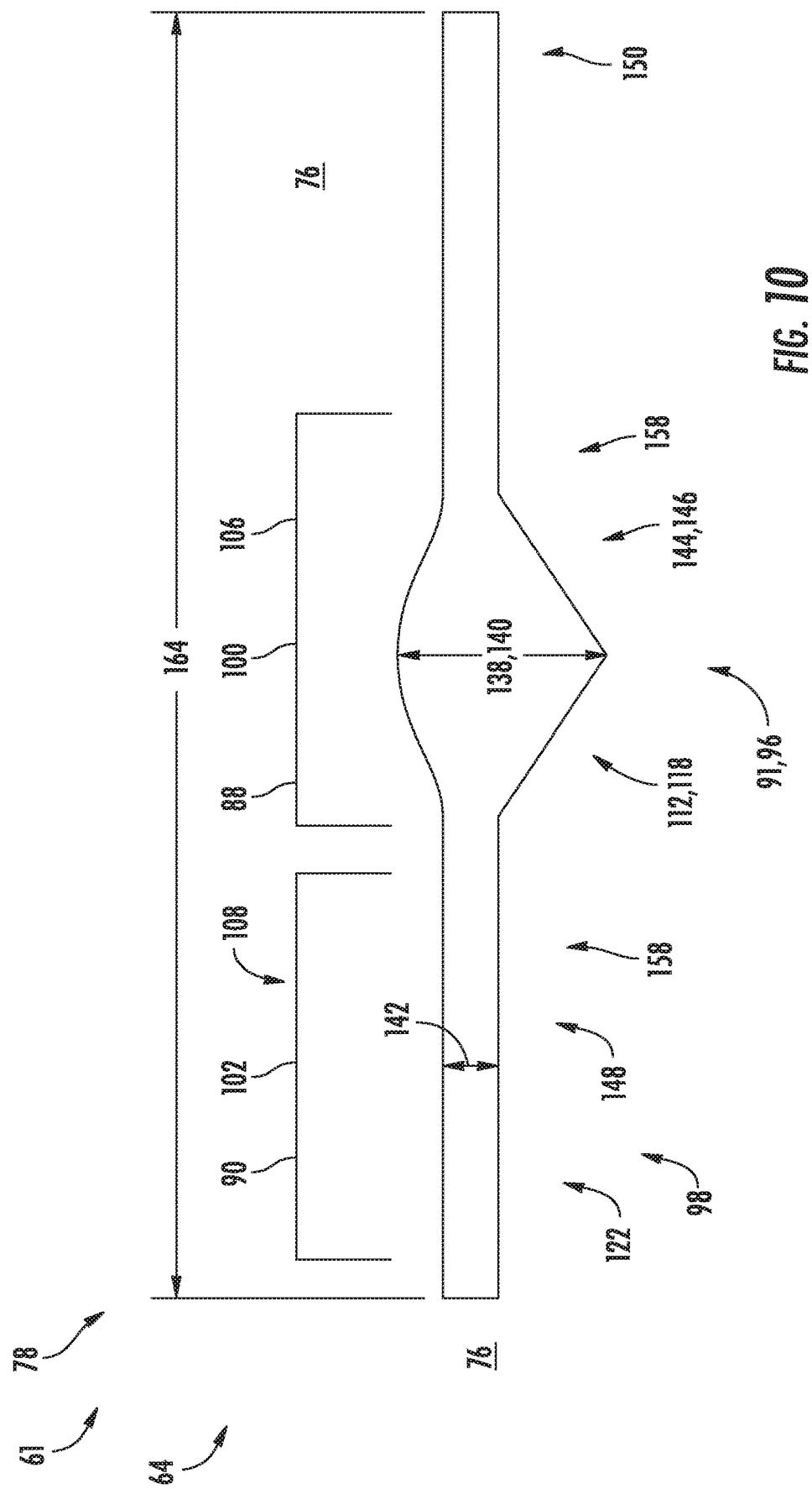

ENGINE CASING TREATMENT FOR REDUCING CIRCUMFERENTIALLY VARIABLE DISTORTION

FIELD

The present subject matter relates generally to engine casing treatments, more particularly, to engine casing treatments for reducing circumferentially variable distortion at the rotating blades of a gas turbine engine.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. Turbofan gas turbine engines typically include a fan assembly that channels air to the core gas turbine engine, such as an inlet to the compressor section, and to a bypass duct. Gas turbine engines, such as turbofans, generally include fan cases surrounding a fan assembly including the fan blades. The compressor section typically includes one or more compressors with corresponding compressor casings.

As is known, an axial compressor for a gas turbine engine may include a number of stages arranged along an axis of the compressor. Each stage may include a rotor disk and a number of compressor blades, also referred to herein as rotor blades, arranged about a circumference of the rotor disk. In addition, each stage may further include a number of stator blades, disposed adjacent the rotor blades and arranged about a circumference of the compressor casing. During operation of a gas turbine engine using a multi-stage axial compressor, a turbine rotor is turned at high speeds by a turbine so that air is continuously induced into the compressor. The air is accelerated by the rotating compressor blades and swept rearwards onto the adjacent rows of stator blades. Each rotor blade/stator blade stage increases the pressure of the air.

In addition, during operation, the fan blades and the first stage of the axial compressor may each include an inlet. The air passing through these inlets may include distortion, such as pressure gradients, velocity gradients, and/or swirl or angular variations. Further, such distortion may be circumferentially varying around the inlet of the fan blades or the compressor blades. Moreover, such distortion may propagate through each subsequent stage of the compressor. Additionally, distortion may be created at the fan blades and/or stages of the compressor and propagate to subsequent stages of the compressor. Such distortion may affect the stall point of the compressor or the fan assembly. Stall on the compressor and/or fan blades may generally reduce the efficiency of the engine. For example, compressor stalls may reduce the compressor pressure ratio and reduce the airflow delivered to a combustor, thereby adversely affecting the efficiency of the gas turbine. A rotating stall in an axial-type compressor typically occurs at a desired peak performance operating point of the compressor. Following rotating stall, the compressor may transition into a surge condition or a deep stall condition that may result in a loss of efficiency and, if allowed to be prolonged, may lead to failure of the gas turbine.

As such, a need exists for an improved engine casing treatment for reducing circumferentially variable distortion at the rotating blades of a gas turbine engine.

BRIEF DESCRIPTION

Aspects and advantages will be set forth in part in the following description, or may be obvious from the description, or may be learned through practice of the invention.

In one aspect, the present subject matter is directed to a rotary component for a gas turbine engine defining a central axis extending along an axial direction, a radial direction extending perpendicular to the axial direction, and a circumferential direction perpendicular to both the central axis and the radial direction. The rotary component includes a plurality of rotor blades operably coupled to a rotating shaft extending along the central axis. The rotary component further includes an outer casing arranged exterior to the plurality of rotor blades in the radial direction and defining an annular gap between a tip of each of the plurality of rotor blades and the outer casing. Further, the outer casing includes a plurality of features on an interior surface of the outer casing. A first feature of the feature(s) defines a first casing thickness, and a second feature of the feature(s) positioned at least partially circumferentially or axially from the first feature defines a second casing thickness different than the first casing thickness.

In one embodiment, the first and second features may each include an axial slot or a circumferential groove. In a further embodiment, the first casing thickness may be greater than the second casing thickness. In such an embodiment, the first casing thickness may be positioned at location of a first distortion level on the interior surface of the outer casing, and the second casing thickness may be positioned at a location of a second distortion level less than the first distortion level. In another embodiment, the first feature may further define a first characteristic, and the second feature may further define a second characteristic. Moreover, the first characteristic may be different than the second characteristic. In one such embodiment, the first and second characteristics may each include a radial height, axial dimension, circumferential dimension, separation from an adjacent feature, and/or internal angle for each of the first and second features.

In an additional embodiment, the first feature may be a first circumferential groove at a first axial location. The second feature may be a second circumferential groove at a second axial location positioned downstream of the first axial location. Moreover, the first and second characteristics may each include a radial height, circumferential length, and/or an axial width. In one such embodiment, a first radial height, first circumferential length, and/or first axial width of the first characteristic maybe greater than a second radial height, second circumferential length, and/or second axial width of the second characteristic.

In another embodiment, the first feature may be a first axial slot at a first circumferential location, and the second feature may be a second axial slot at a second circumferential location. Moreover, the first and second characteristics may each include a radial height, circumferential width, orientation, and/or axial length. In one such embodiment, the first casing thickness may be greater than the second casing thickness. Further, a first separation from an adjacent feature of the first characteristic may be less than a second separation from an adjacent feature of the second characteristic. In another embodiment, a first radial height, circumferential width, orientation, and/or axial length of the first characteristic may be greater than a second radial height, circumferential width, orientation, and/or axial length of the second characteristic.

In additional embodiments, each of the features may be positioned radially outward from one or more of the rotor blades. Further, each of the features may be positioned axially between a leading edge and a trailing edge of the rotor blade(s). In another embodiment, one or more of the features may be positioned at least partially radially outward from one or more of the rotor blades. Further, the feature(s) may be positioned at least partially axially forward of a leading edge or at least partially axially rearward of trailing edge of the rotor blade(s). In one embodiment, the rotary component may be a fan section or compressor of the gas turbine engine. As such, the rotor blade(s) may include a plurality of fan blades or compressor blades, respectively.

In another aspect, the present subject matter is directed to another rotary component for a gas turbine engine defining a central axis extending along an axial direction, a radial direction extending perpendicular to the axial direction, and a circumferential direction perpendicular to both the central axis and the radial direction. The rotary component includes a plurality of rotor blades operably coupled to a rotating shaft extending along the central axis. The rotary component further includes an outer casing arranged exterior to the plurality of rotor blades in the radial direction. The outer casing defines an annular gap between a tip of each of the plurality of rotor blades and the outer casing. Further, the outer casing includes a plurality of features on an interior surface of the outer casing. The features include one or more circumferential grooves extending along the circumferential direction. The circumferential groove(s) defines a first characteristic at a first circumferential position and a second characteristic at a second circumferential position. Moreover, the first characteristic is different than the second characteristic.

In one embodiment, the first and second characteristics may each include a casing thickness, radial height, axial width, orientation, separation from an adjacent feature, and/or an internal angle. In one such embodiment, at least one of a first casing thickness, radial height, axial width, or separation from an adjacent feature of the first characteristic may be greater than a second casing thickness, radial height, axial width, or separation from an adjacent feature of the second characteristic. Moreover, in such an embodiment, the first characteristic may be positioned at a location of a first distortion level on the interior surface of the outer casing, and the second characteristic may be positioned at a location of a second distortion level on the interior surface of the outer casing less than the first distortion level.

In a further embodiment, one circumferential groove may be positioned radially outward from one rotor blade of the rotor blades. As such, the circumferential groove may be positioned axially between a leading edge and a trailing edge of the rotor blade. In another embodiment, one circumferential groove may be positioned at least partially radially outward from one rotor blade of the plurality of rotor blades and at least partially axially forward of a leading edge or at least partially axially rearward of trailing edge of the rotor blade. In one embodiment, the rotary component may be a fan section or compressor of the gas turbine engine. As such, the rotor blade(s) may include a plurality fan blades or compressor blades, respectively. It should be further understood that the rotary component may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 10 illustrates one embodiment of a feature according to aspects of the present disclosure, particularly illustrating a circumferential groove extending circumferentially through both high and low distortion locations.

Figure 1:
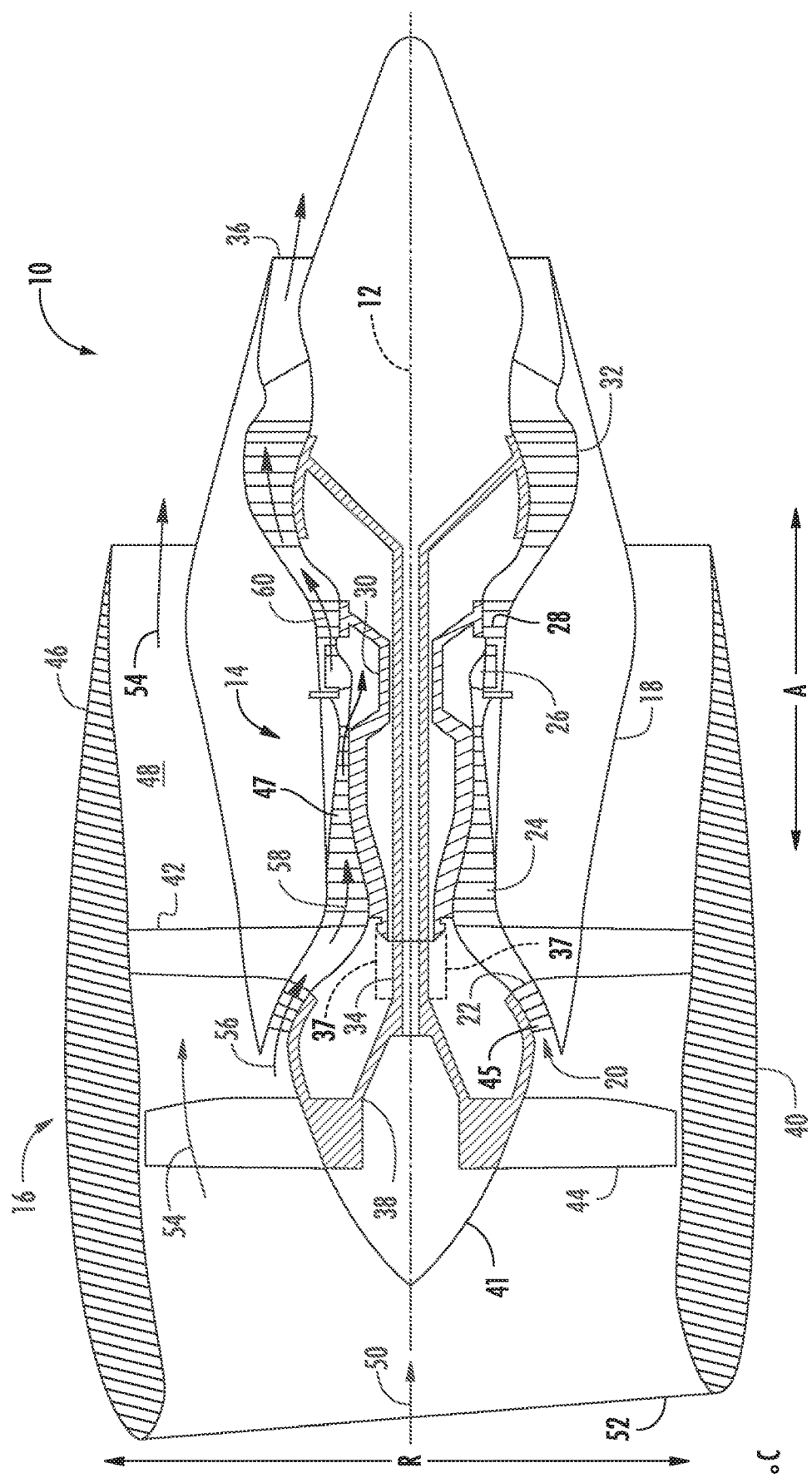
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A rotary component is generally provided including a plurality of rotor blades connected to a rotating shaft and surrounded by an outer casing. The rotor blades and outer casing define an annular gap extending therebetween. Further, the outer casing includes one or more features on an interior surface of the outer casing. For example, the feature(s) may be positioned at least partially within the annular gap. Further, a first feature may define a first casing thickness while a second feature positioned axially, circumferentially, or both from the first feature may define a second casing thickness different than the first casing thickness. In certain embodiments, the first feature may further define a first characteristic different than a second characteristic of the second feature. As such, the difference in the first casing thickness and second casing thickness and/or the difference in the first characteristic and second characteristic may reduce a circumferentially varying distortion at one of the first or second features.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine 10 is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extending perpendicular from the centerline 12. Further, a circumferential direction C (shown in/out of the page in FIG. 1) extends perpendicular to both the centerline 12 and the radial direction R. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products 60 are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products 60 may be expelled from the core engine 14 via an exhaust nozzle 36 to provide propulsive jet thrust.

Figure 2:
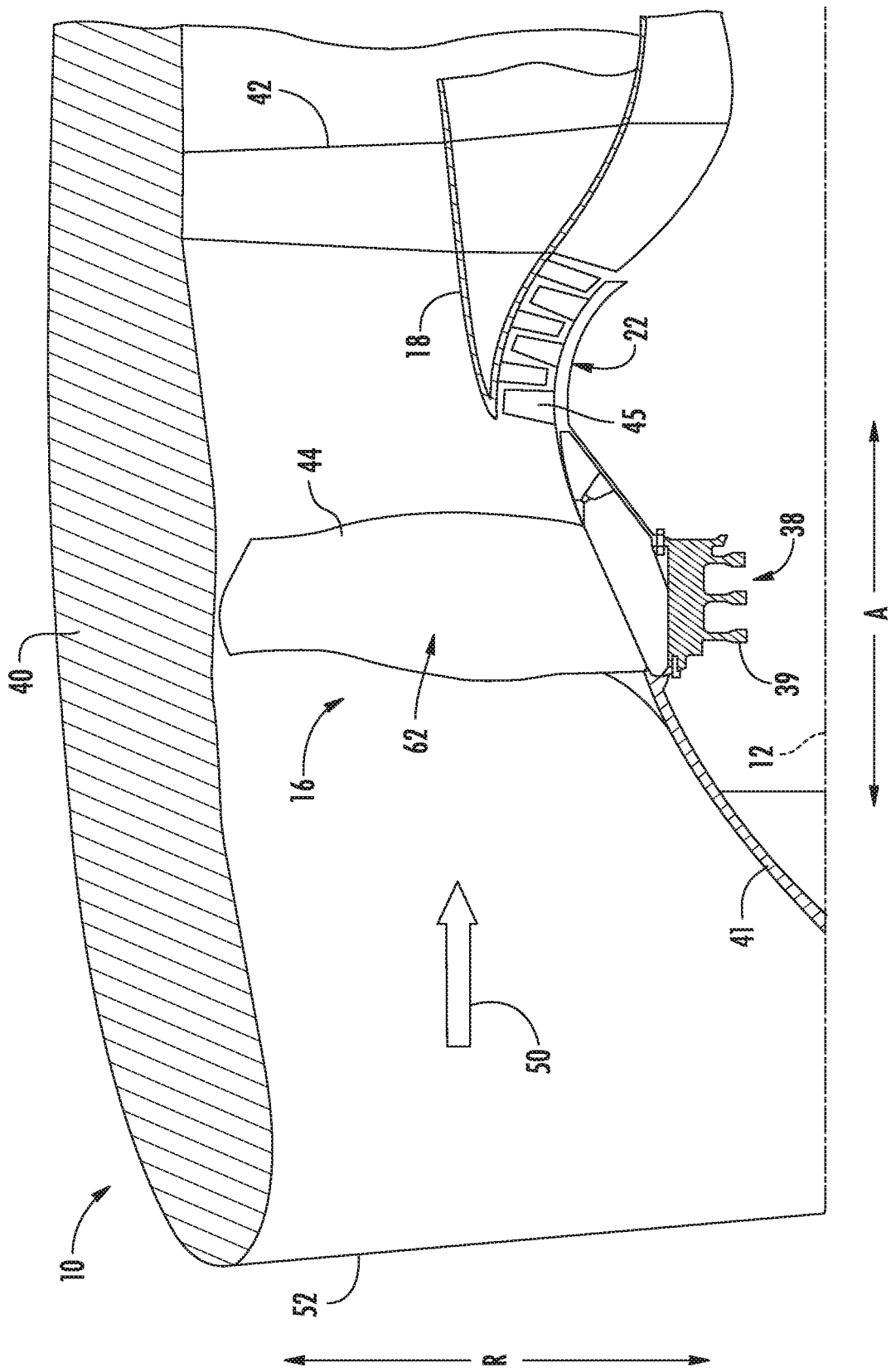
FIG. 2 illustrates a cross-sectional view of the fan section of FIG. 1 in accordance with aspects of the present subject matter, particularly illustrating a fan blade of the fan section.

Additionally, as shown in FIGS. 1 and 2, the fan section 16 of the gas turbine engine 10 generally includes a rotatable, axial-flow fan rotor 38 configured to be surrounded by an annular fan casing 40. In particular embodiments, the LP shaft 34 may be connected directly to the fan rotor 38 or rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required. Additionally, the fan rotor 38 and/or rotor disk 39 may be enclosed or formed as part of a fan hub 41.

It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the fan casing 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The LP compressor 22 may include a plurality of rotor blades (LP rotor blades 45) enclosed by the outer casing 18. The pressure of the second compressed air flow 56 is then increased and enters the HP compressor 24 (as indicated by arrow 58). Additionally, the HP compressor 24 may include a plurality of rotor blades (HP rotor blades 47) enclosed by the outer casing 18. After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 3:
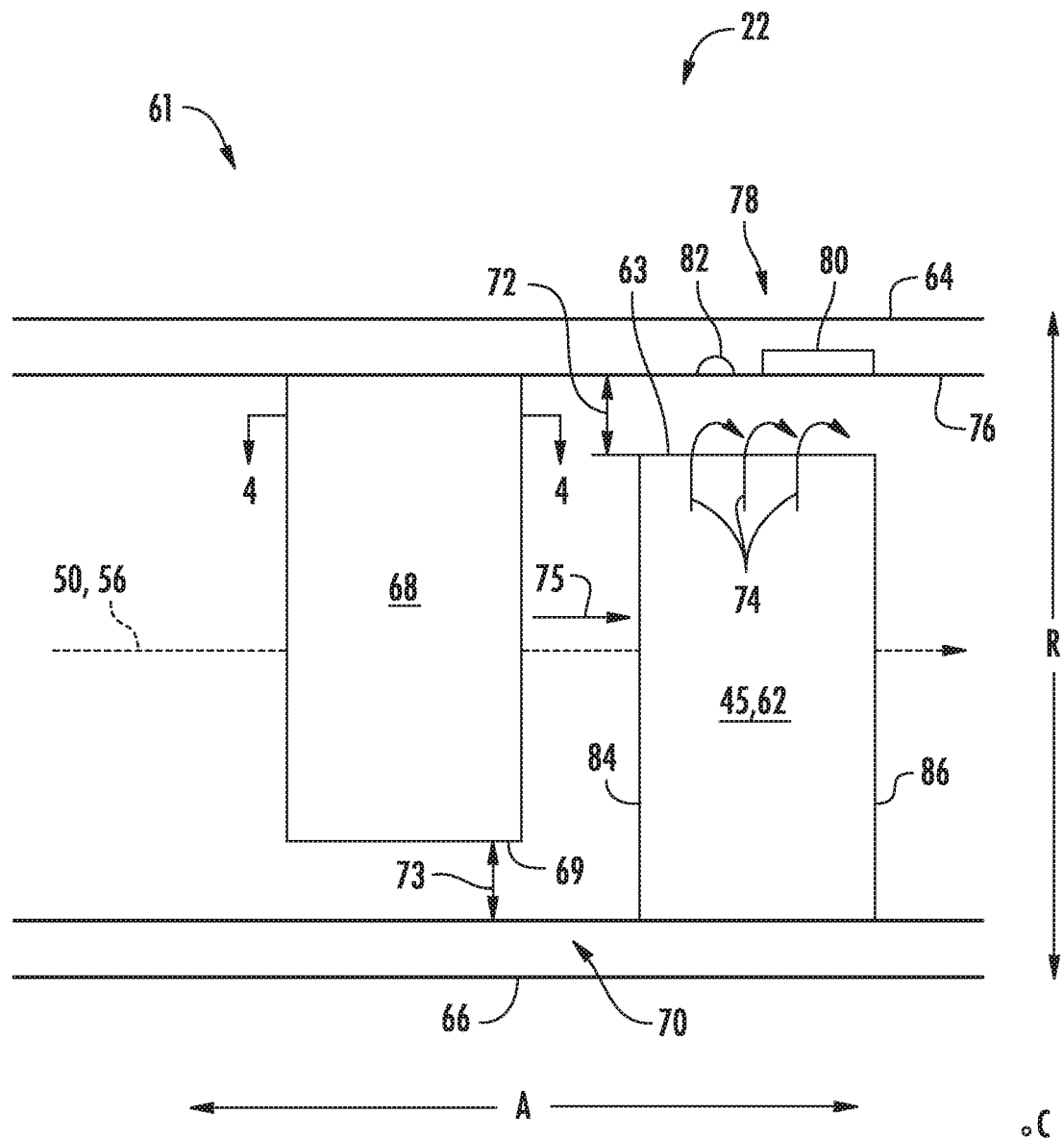
FIG. 3 illustrates a schematic view of a rotary component of the gas turbine engine in accordance with aspects of the present subject matter, particularly illustrating the rotary component configured as a compressor.
Figure 4:
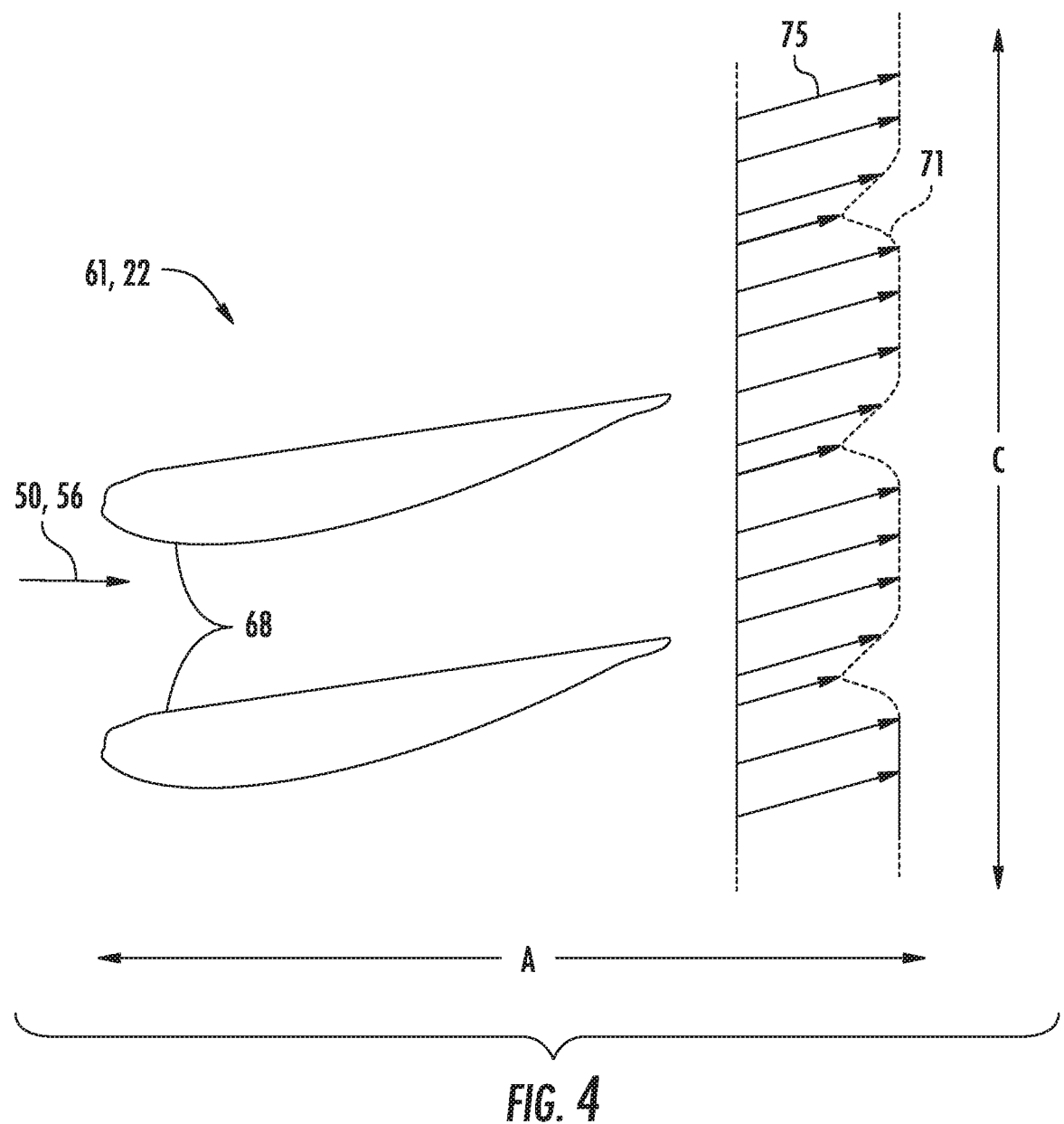
FIG. 4 illustrates a cross-section of the rotary component of FIG. 3 along section line 4-4 in accordance with aspects of the present subject matter.

Referring now to FIGS. 3-4, illustrated schematically is rotary component 61 of the gas turbine engine 10. Specifically, the rotary component 61 is configured as a portion of the LP compressor 22, but it should be appreciated that the rotary component 61 may be configured as the HP compressor 24, the fan section 16, the HP turbine 28, the LP turbine 32, and/or any other rotary component 61 of the gas turbine engine 10. As indicated, FIG. 4 is taken along section line 4-4 of FIG. 3. The rotary component 61 includes a one or more sets of circumferentially spaced rotor blades 62, such as the LP rotor blades 45, which extend radially outward towards an outer casing 64 from a hub 66. As such, the rotor blades 62 may be coupled to a rotating shaft (such as the HP shaft 30 or LP shaft 34 as shown in FIG. 1). Further, the outer casing 64 may be arranged exterior to the rotor blades 62 in the radial direction R. It should be appreciated that the outer casing 64 may be a part of the outer casing 18 or fan casing 40 or a standalone component coupled thereto. One or more sets of circumferentially-spaced stator blades 68 (of which only a single stator blade 68 is shown in FIG. 3) may be positioned adjacent to each set of rotor blades 62, and in combination form one of a plurality of stages 70 (of which only a single stage 70 is shown in FIG. 3). However, in other embodiments, such stator blades 68 may be absent, such as when the rotary component 61 is the fan section 16. Each of the stator blades 68 may be securely coupled to the outer casing 64 and extends radially inward to interface with the hub 66. Each of the rotor blades 62 may be circumscribed by the outer casing 64, such that an annular gap 72 is defined between the outer casing 64 and a rotor blade tip 63 of each rotor blade 62. Likewise, the stator blades 68 are disposed relative to the hub 66, such that an annular gap 72 is defined between the hub 66 and a stator blade tip 69 of each of the stator blades 68.

During operation, an operating range of the rotary component 61 is generally limited due to leakage flow, as indicated by directional arrows 74, proximate the rotor blade tips 63. In addition to leakage flow 74, the initial airflow 50 traveling through the inlet 52 and/or the second compressed airfoil 56 traveling through the annular inlet 20 may include circumferential flow non-uniformities 75. Such flow non-uniformities 75 may be present in the initial airflow 50 passing through the inlet 52, and/or the fan section 16 may form such circumferential flow non-uniformities 75. In other situations, the stator blades 68 and/or rotor blades 62 may form such circumferential flow non-uniformities 75 that propagate downstream. As best illustrated in FIG. 4, the circumferential flow-non-uniformities 75 are present in the form of a plurality of wakes 71.

Figure 5:
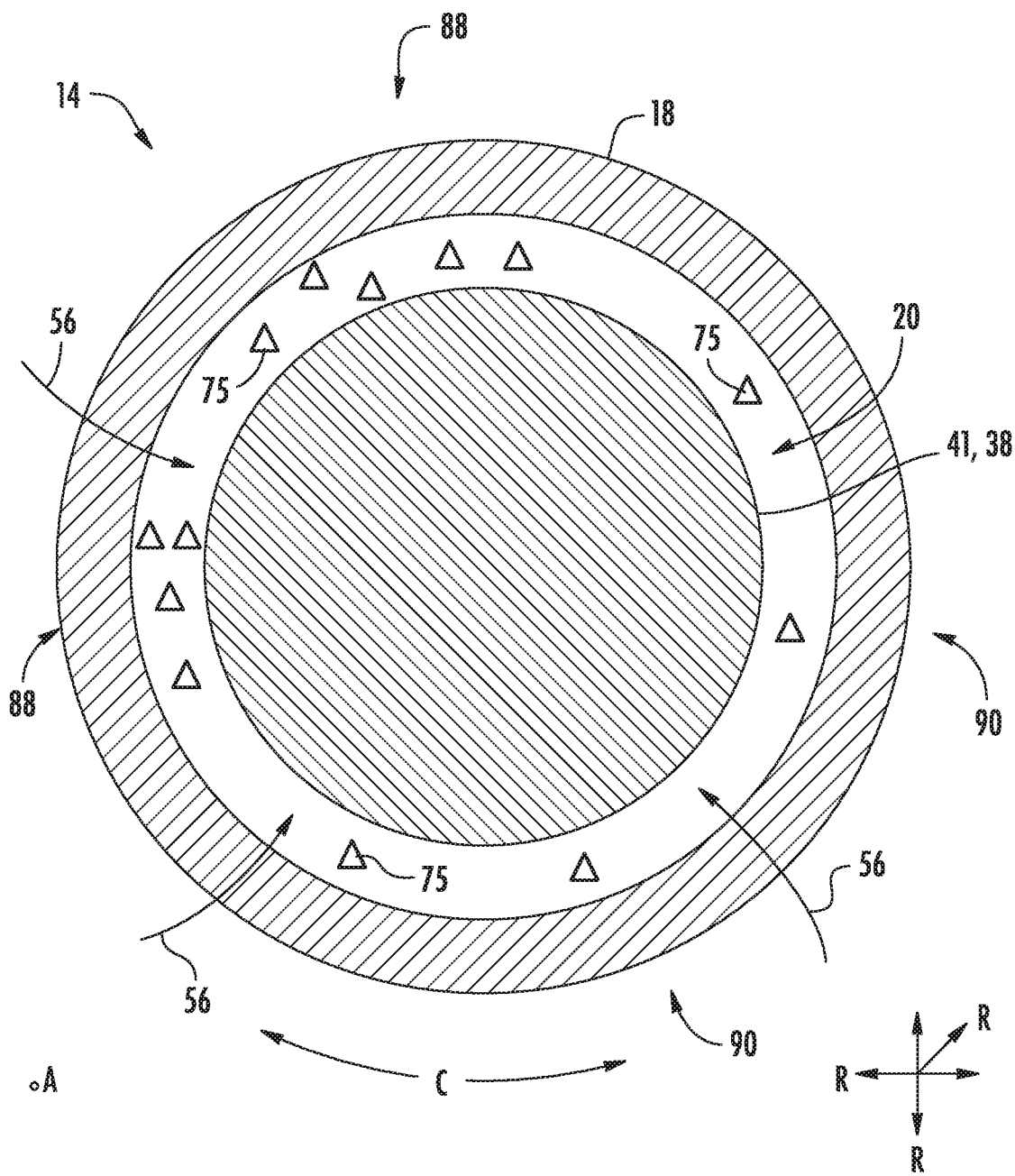
FIG. 5 illustrates a cross-section of a core engine taken the along radial and circumferential directions in accordance to aspects of the present subject matter, particularly illustrating a cross-section taken at an annular inlet of the core engine.

Referring now to FIG. 5, a cross-section of the core engine 14 is illustrated along the radial direction R and circumferential direction C. More specifically, FIG. 5 illustrates a cross-section of the core engine 14 taken at the annular inlet 20 of the core engine 14. Further, as illustrated, the inlet 20 is defined between the fan hub 41 and/or fan rotor 38 and the outer casing 18 of the core engine 14. As such, the second compressed airfoil 56 may be directed through the annular inlet 20 and into the core engine 14. As shown, the second compressed airflow 56 may contain flow non-uniformities (illustrated as shaded triangles 75 in FIG. 5) such as but not limited to pressure, temperature, velocity, and/or swirl or angular variations. As shown, the flow non-uniformities 75 may vary along the circumferential direction C of the inlet 20. As such, the compressed airflow 56 may define one or more high distortion locations 88 and one or more low distortion level location 90. Further, the high distortion locations 88 may propagate downstream of the inlet 20 and affect the stall margins and/or efficiency of the compressors 22, 24. It should be appreciated that such high distortion locations 88 may be present in the initial airflow 50 passing through the inlet 52 of the gas turbine engine 10. Additionally, or alternatively, the high distortion location(s) 88 may be introduced in the second compressed airflow 56 by the fan section 16 and propagate downstream to the inlet 20 of the core engine 14.

Though the inlet 20 is illustrated in FIG. 5, it should be appreciated that such high distortion level locations 88 may be present in the initial airflow 50 entering the inlet 52 and further affect the stall margins and efficiency of the fan section 16, the LP compressor 22, and/or the HP compressor 24. Further, such high distortion level locations 88 may be introduced by one or more stages 70 of the rotary component(s) 61 and affect stages 70 of the rotary component(s) 61 downstream thereof. For example, high distortion level locations 88 may be introduced by the fan section 16 and affect the LP compressor 22 and HP compressor 24 downstream of the fan section 16. Further, high distortion level locations 88 flowing through annular inlet 20 may affect the LP compressor 22 and HP compressor 24. Further, high distortion locations 88 may be introduced by the LP compressor 22 (such as by the upstream stages 70 of the LP compressor 22) and affect later stages 70 of the LP compressor 22 or the HP compressor 24. In addition, high distortion locations 88 may be introduced by the HP compressor 24 (such as by the upstream stages 70 of the HP compressor 24) and affect later stages 70 of the HP compressor 24.

A specific rotor stall point is determined by the operating conditions and the rotary component design. To increase the range of this operation, some previous rotary components have included endwall treatments, such as circumferential grooves 82, in an attempt to provide an increase in the operating range by redirecting and/or minimizing leakage flow 74. Due to these endwall treatments being formed geometrically identical circumferentially about the entire annulus, previous known endwall treatments have failed to additionally address the circumferential flow non-uniformities 75 introduced by the upstream airflow 50, 56 and/or by upstream rotor blades 62 or stator blades 68. Disclosed herein are novel features 78 for the outer casing 64 that address the circumferential flow non-uniformities 75 described herein and improve stall margins.

Referring now specifically to FIG. 3, the outer casing 64 may define an interior surface 76. As such, the annular gap 72 may be defined between the rotor blades 62 and the interior surface 76. Further, the interior surface 76 may include a plurality of the features 78. For instance, the features 78 may include one or more axial slots 80 extending generally along the axial direction A and/or circumferential grooves 82 extending generally along the circumferential direction C. Such features 78 may be formed in the outer casing 64 after manufacturing the outer casing 64 (e.g., the features 78 may be machined in the interior surface 76 of the outer casing 64). However, in other embodiments, the feature(s) 78 may be formed integrally with the outer casing 64 (e.g., the features 78 may be formed in the outer casing 64 during an additive manufacturing process or casting process).

As further illustrated in FIG. 3, one or more of the features 78, such as each of the features 78, may be positioned radially outward from one or more of the rotor blades 62. Further, the feature(s) 78 may be positioned axially between a leading edge 84 and a trailing edge 86 of the rotor blade(s) 62. For instance, each of the features 78 may be positioned between the leading edges 84 and trailing edges 86 of the rotor blades 62 of a stage 70 of the rotary component 61. As such, the feature(s) 78 may be positioned in one or more of the annular gaps 72 positioned between the rotor blade tips 63 of a stage 70 and the outer casing 64. In further embodiments, one or more of the features 78 of may be positioned at least partially radially outward from one or more of the rotor blades 62 on the interior surface 76 of the outer casing 64. For instance, the feature(s) 78 may be positioned at least partially axially forward of the leading edge 84 or at least partially axially rearward of trailing edge 86 of the rotor blade(s) 62, such as the rotor blades 62 of a stage 70. As such, one or more of the features 78 may be positioned partially within one or more of the annular gaps 72.

Figure 6:
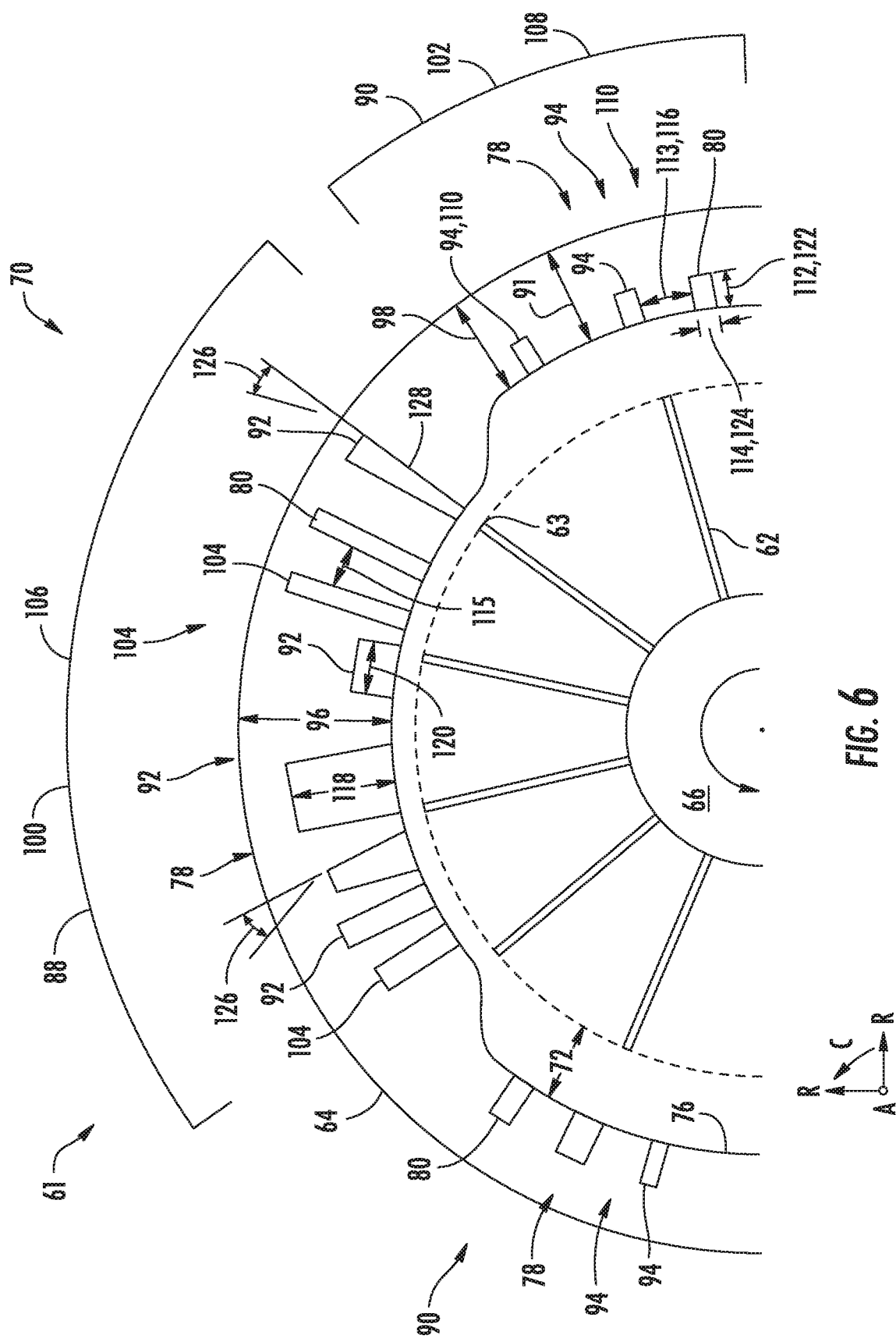
FIG. 6 illustrates a cross-sectional view of one embodiment of the rotary component including features on an interior surface of an outer casing, particularly illustrating a cross-sectional view of a stage of the rotary component.
Figure 8:
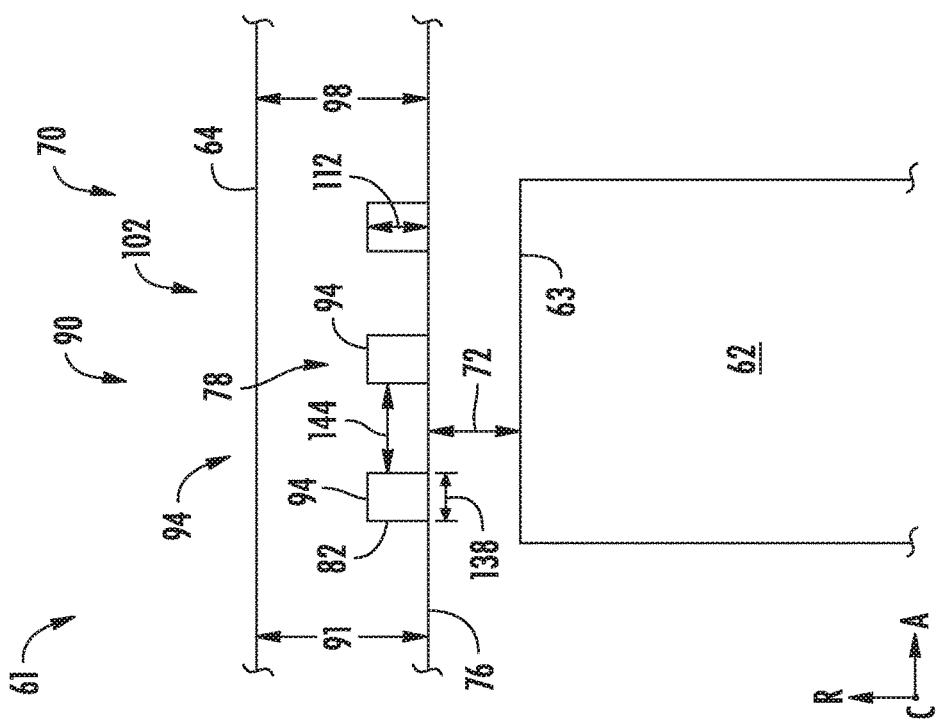
FIG. 8 illustrates another cross-sectional view of embodiment of the rotary component of FIG. 7 according to aspects of the present disclosure, particularly illustrating a low distortion location.
Figure 7:
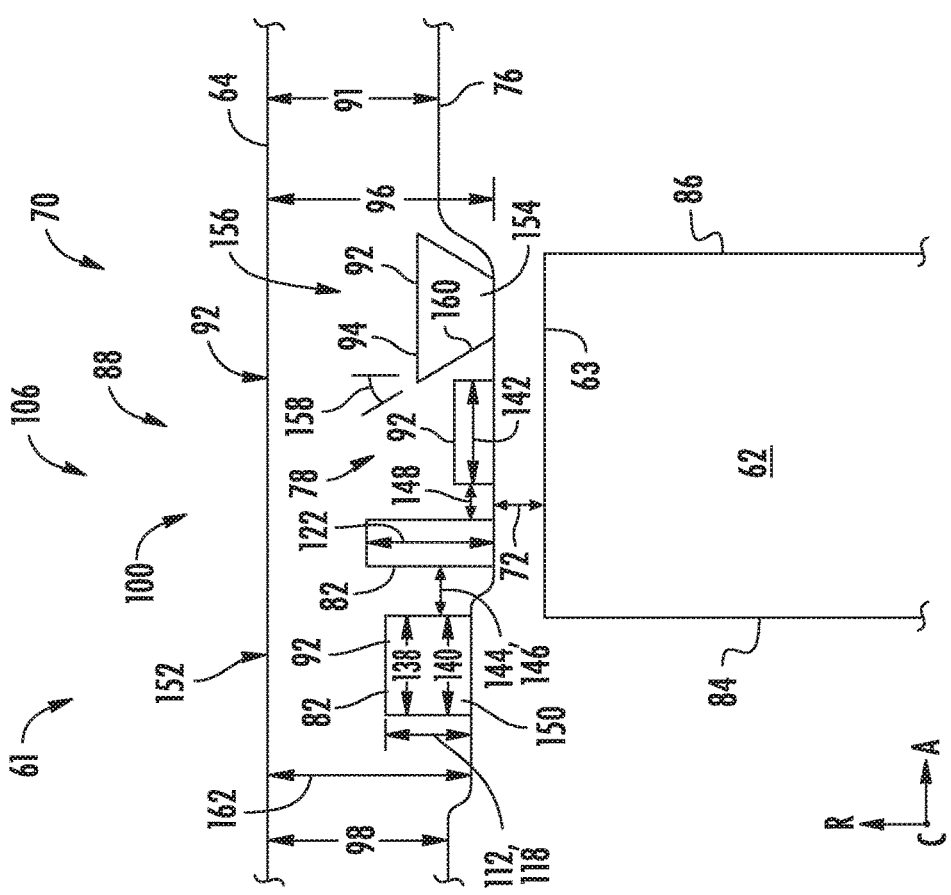
FIG. 7 illustrates a cross-sectional view of another embodiment of the rotary component along the axial and radial directions according to aspects of the present disclosure, particularly illustrating a high distortion location.

Referring to now generally to FIGS. 6-8, multiple views of rotary components 61 including features 78 on the interior surface 76 of the outer casing 64 are illustrated in accordance to aspects of the present subject matter. Particularly, FIG. 6 illustrates a cross-sectional view of one embodiment of a stage 70 of a rotary component 61 according to aspects of the present disclosure taken along the radial direction R and the circumferential direction C illustrating a plurality of features 78 configured as axial slots 80. FIGS. 7 and 8 illustrate multiple, cross-sectional views of one embodiment of a rotary component 61 according to aspects of the present disclosure taken along the axial direction A and radial direction R illustrating a plurality of features 78 configured as circumferential grooves 82. Particularly, FIG. 7 illustrates the rotary component 61 at a high distortion location 88. Whereas, FIG. 8 illustrates the rotary component 61 at a low distortion location 90. It should be recognized that the rotary component 61 may be the fan section 16, a compressor 22, 24, or a turbine 28, 32 as described herein or any other suitable rotary component 61. Further, the airflow passing though the annular gap 72 may include one or more high distortion locations 88 and one or more low distortion locations 90 (as described in regards to FIG. 5).

As shown, the outer casing 64 may define a casing thickness 91. Further, the casing thickness 91 may be circumferentially varying along the circumferential direction C. Further, the casing thickness 91 may additionally, or alternatively, be axially varying along the axial direction A (FIG. 7). As such, the annular gap 72 defined between the interior surface 76 of the outer casing 64 and the rotor blade tips 63 of the stage 70 may also be circumferentially and/or axially varying. More particularly, the annular gap 72 may be larger where the casing thickness 91 is smaller, and the annular gap 72 may be smaller where the casing thickness 91 is larger.

Still referring generally to FIGS. 6-8, a first feature 92 of the feature(s) 78 may define a first casing thickness 96, and a second feature 94 of the feature(s) 78 positioned at least partially circumferentially or axially from the first feature 92 may define a second casing thickness 98 different than the first casing thickness 96. Further, as illustrated, the first casing thickness 96 may be defined around a plurality of first features 92. Similarly, the second casing thickness 98 may be defined around a plurality of second features 94.

Additionally, the outer casing 64 may include a location of a first distortion level on the interior surface 76 of the outer casing 64 and a location of a second distortion level on the interior surface 76 of the outer casing 64. For instance, the interior surface 76 of the outer casing 64 may define a first distortion level 100 at the first feature(s) 92. Or, more particularly, the airflow passing though the annular gap 72 between the interior surface 76 of the outer casing 64 and the rotor blade tips 63 at the first feature(s) 92 may define the first distortion level 100 at or upstream of the stage 70 of the rotary component 61. Similarly, the interior surface 76 of the outer casing 64 may define a second distortion level 102 at the second feature(s) 94. Or, more particularly, the airflow passing through the annular gap 72 between the interior surface 76 of the outer casing 64 and the rotor blade tips 63 at the second feature(s) 92 may define the second distortion level 102 at or upstream of the stage 70 of the rotary component 61.

It should be appreciated that the first distortion level 100 may be defined at a high distortion location 88 whereas the second distortion level 102 may be defined at a low distortion location 90. As such, the second distortion level 102 at the second feature(s) 94 may be less than the first distortion level 100 at the first feature(s) 92. Additionally, the first casing thickness 96 may be greater than the second casing thickness 98 in order to reduce the size of the annular gap 72 and thus reduce the distortion level of the airflow passing through the high distortion location(s) 88.

As shown generally in FIGS. 6-8, the first feature(s) 92 may further define one or more first characteristics, and the second feature(s) 94 may further define one or more second characteristics. Moreover, the first characteristic(s) may be different than the second characteristic(s). In one such embodiment, the first and second characteristics may each include one or more radial heights, axial dimensions, circumferential dimensions, separations from an adjacent feature 78, and/or internal angles for each of the first and second features 92, 94 as described in more detail below.

Referring now specifically to FIG. 6, in the illustrated embodiment, the first feature(s) 92 may include one or more first axial slots 104 at a first circumferential location 106. Further, the second features(s) 94 may include one or more second axial slots 110 at a second circumferential location 108. It should be appreciated that the first circumferential location 106 may correspond to a high distortion location 88 while the second circumferential location 108 may correspond to a low distortion location 90.

Moreover, the first and second characteristics of the first axial slot(s) 104 and second axial slot(s) 110 may each include a radial height 112 and/or circumferential width 114. As described above, the first casing thickness 96 at the first circumferential location 106 may be greater than the second casing thickness 98 at the second circumferential location 108. In certain embodiments, the first and/or second characteristics of the first and second axial slot(s) 104, 110 may include a circumferential separation 113 from an adjacent feature 78 (such an adjacent axial slot 80 or circumferential groove 82). Further, a first circumferential separation 115 from an adjacent feature 78 of the first characteristic may be less than a second circumferential separation 116 from an adjacent feature 78 of the second characteristic. In further embodiments, a first radial 118 height and/or first circumferential width 120 of the first characteristic may be greater than a second radial height 122 and/or second circumferential width 124 of the second characteristic.

Further, one or more of the first and/or second axial slots 104, 110 may define one or more internal angles, such as a first angle 126, defined between a circumferential sidewall 128 and the radial direction R. The first angle 126 (as well as other internal angles included herein, such as third angle 158) is defined here to be positive if the circumferential sidewall 128 causes the feature 78 to expand as the feature 78 extends outward in the radial direction R; the first angle 126 is defined here to be negative if the circumferential sidewall 128 causes the feature 78 to contract as the feature 78 extends outward in the radial direction R. As such, a first angle 126 of at least one of the first axial slots 104 may be larger than a first angle 126 of at least one of the second axial slots 110. It should also be appreciated that although the second axial slots 110 are illustrated extending along the radial direction R, the second axial slot(s) 110 may define one or more positive or negative first angles 126.

It should be appreciated that the first axial slot(s) 104 with a thicker casing thickness 91, smaller circumferential separation 113, taller radial height 112, larger first angle 126, and/or longer circumferential width 114 compared to the second axial slot(s) 110 may reduce the distortion level of the airflow at the first circumferential location 106. More particularly, such first axial slot(s) 104 may reduce or eliminate flow non-uniformities 75 (see, e.g., FIGS. 3 and 4) at the first circumferential location 106.

Figure 9:
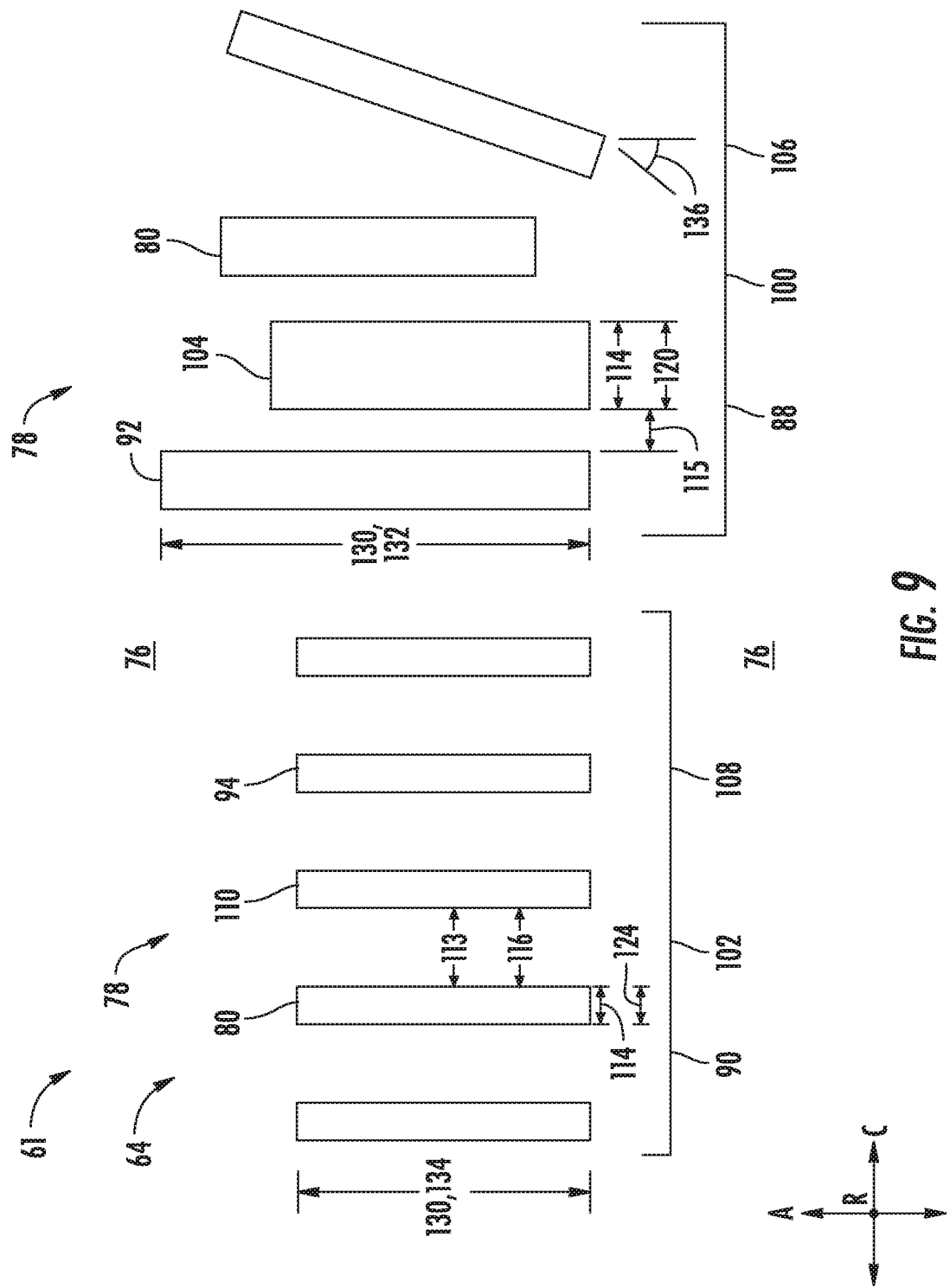
FIG. 9 illustrates another embodiment of the rotary component of FIG. 6 in accordance with aspects of the present disclosure, particularly illustrating a top view looking down on axial slots defined in an interior surface of the outer casing.

Referring now to FIG. 9, another view of the rotary component 61 of FIG. 6 is illustrated according to aspects of the present disclosure. More particularly, FIG. 9 illustrates a top view looking down on the features 78 (e.g., the axial slots 80) defined in the interior surface 76 of the outer casing 64. For example, first axial slots 104 may be positioned at the first circumferential location 106 and may be positioned where the airflow is at the first distortion level 100, such as the high distortion location 88. Further, second axial slots 110 may be positioned at the second circumferential location 108 and may be positioned where the airflow is at the second distortion level 102, such as the low distortion location 90.

As illustrated in FIG. 9, each of the axial slots 80 may include an axial length 130. For instance, the first characteristic of the first axial slot(s) 104 may include one or more first axial lengths 132. Similarly, the second characteristic of the second axial slot(s) 110 may include one or more second axial lengths 134. In certain embodiments, a first axial length(s) 132 of the first axial slot(s) 104 may be longer than the second axial length(s) 134 of the second axial slot(s) 110. As further illustrated in FIG. 9, one or more of the axial slots 80 may be arranged at an orientation relative to the axial direction A. For instance, the first and/or second characteristics of one or more of the axial slots 80 may define a second angle 136 relative to the axial direction A. Moreover, in certain embodiments, the second angle 136 of the first axial slot(s) 104 may be greater than the second angle 136 of the second axial slot(s) 110. It should be appreciate that, although the second axial slots 110 are illustrated parallel to the axial direction A in FIG. 9, one or more of the second axial slots 110 may define the second angle 136 relative to the axial direction A. As such, first axial slots 104 with longer axial lengths 134 and/or greater second angles 136 may reduce the distortion level of the airflow at the first circumferential location 106. More particularly, such first axial slot(s) 104 may reduce or eliminate flow non-uniformities 75 (see, e.g., FIGS. 3 and 4) at the first circumferential location 106.

Referring again to FIG. 7, in certain embodiments, the first feature 92 may be a first circumferential groove 150 at a first axial location 152. In one such embodiment, as shown, the second feature 94 may be a second circumferential groove 154 at a second axial location 156 positioned downstream of the first axial location 152. In certain embodiments, the first feature/first circumferential groove 92, 150 may include two or more first features/first circumferential grooves 92, 150 configured generally the same, such as with the same first characteristics described below. Similarly, the second feature/second circumferential groove 94, 154 may include a two or more second features/second circumferential grooves 94, 154 configured generally the same, such as with the same second characteristics described below. It should be recognized that in certain embodiments, three or more features 78 may be defined in the interior surface 76 of the outer casing 64 at three or more different casing thicknesses 91. For instance, one or more features 78 may be positioned on the outer casing 64 at the first casing thickness 96 (e.g., the second circumferential groove 154). One or more features 78 may be positioned on the outer casing 64 at the second casing thickness 98 (see, e.g., the features 78 of FIGS. 8 and 6). Further, one or more features 78 may be positioned on the outer casing 64 at a third thickness 162 different than the first and second thicknesses 96, 98 (e.g., the first circumferential groove 150 of FIG. 7). However, it should be recognized that the rotary component 61 may include four or more features 78 positioned at four or more different casing thicknesses 91.

As shown in FIG. 7, the first and second circumferential grooves 150, 154 (e.g., the first and second features 92, 94) may each include one or more first and second characteristics, respectively, such as a radial height 112, an axial width 138, an axial separation 144 from an adjacent feature 78, and an internal angle (e.g., a third angle 158 defined between an axial sidewall 160 and the radial direction R). For example, the first circumferential groove(s) 150 may define a first radial height 118, a first axial width 140, a first axial separation 146, and/or a first internal angle (e.g., zero degrees in the embodiment of FIG. 7). Further, the second circumferential groove(s) 154 may define a second radial height 122, a second axial width 142, a second axial separation 148, and/or a second internal angle (e.g., the third angle 158) different than the first radial height 118, axial width 140, first axial separation 146, and internal angle.

In certain embodiments, at least one of the first radial height 118, axial width 140, axial separation 146, and/or first internal angle may be larger than the second radial height 122, axial width 142, axial separation 148, and/or second internal angle. However, in other embodiments, at least one of the first radial height 118, axial width 140, and/or first internal angle may be smaller than the second radial height 122, axial width 142, and/or second internal angle. It should be appreciated that the first and second circumferential grooves 150, 154 may be positioned at one or more first circumferential locations 106 where the airflow passing through the rotary component 61 has the first distortion level 100 (e.g., the high distortion level location 88). As such, the first and second circumferential grooves 150, 154 with at least one changing characteristic down the axial direction A may reduce the distortion level of the airflow passing through the high distortion location(s) 88. It should also be appreciated that the first and second circumferential grooves 150, 154 may define the same, or approximately the same, circumferential length 164 (see FIG. 10). However, in other embodiments, one of circumferential grooves 150, 154 may define a longer or shorter circumferential length 164.

It should be recognized that although the first a second features 92, 94 are described as the same type of feature (e.g. both as axial slots 80 or circumferential grooves 82), in other embodiments the first and second features 92, 94 may include different types of features. For instance, the first feature 92 may be an axial slot 80 while the second feature 94 may be a circumferential groove 82. Further, the first feature 92 configured as an axial slot 80 and the second feature 94 configured as a circumferential groove 82 may be positioned within the same stage 70 of the rotary component 61. However, in other embodiments, the second feature 94 may be positioned in a stage 70 axially upstream or downstream of the first feature 92. As described generally above, the first feature 92 may define a first casing thickness 96 and/or one or more first characteristics different than a second casing thickness 98 and/or one or more second characteristics of the second feature 94 as described generally above. In a still further embodiment, a single stage 70 may include first and second axial slots 104, 110 including different casing thicknesses 96, 98 and/or different characteristics as well as first and second circumferential grooves 150, 154 including different casing thicknesses 96, 98 and/or different characteristics.

Referring now to FIG. 10, another embodiment of the feature 78 is illustrated according to aspects of the present disclosure. Particularly, FIG. 10 illustrates a circumferential groove 150 extending along the circumferential direction C through high and low distortion locations 88, 90. As shown, the circumferential groove 150 may intersect one or more first circumferential locations 106 and second circumferential locations 108. Further, the interior surface 76 of the outer casing 64 may include a location of a first distortion level 100 (e.g., the high distortion location 88) at the first circumferential location(s) 106 higher than a location of a second distortion level 102 (e.g., the low distortion location 90) at the second circumferential location(s) 108. More particularly, the airflow passing through the annular gap 72 at the first circumferential location 106 may define the first distortion level 100 higher than an airflow passing through the annular gap 72 at the second circumferential location 108 at the lower, second distortion level 102.

In certain embodiments, the casing thickness 91 of the outer casing 64 may be different at the first circumferential location 106 than at the second circumferential location 108. For instance, the outer casing 64 may define a first casing thickness 96 at the first circumferential location 106 greater than a second casing thickness 98 at the second circumferential location 108, as described generally in regards to FIGS. 6 and 7. As shown, the circumferential groove 150 may define one or more first characteristics at the first circumferential location 106. For instance, the circumferential groove 150 may define a first radial height 118, a first axial separation 146, a first axial width 140, and a first internal angle (e.g., the third angle 158) as described generally in regards to FIG. 7. Further, the circumferential groove 150 may define one or more second characteristics at the second circumferential location 108. For example, the circumferential groove 150 may define a second radial height 122, a second axial separation 148, a second axial width 142, and a second internal angle (e.g., the third angle 158) as described generally in regards to FIG. 7. Furthermore, at least one of the first characteristics may be different than at least one of the second characteristics.

More particularly, in one embodiment, a first casing thickness 96, radial height 118, axial width 140, internal angle, and/or axial separation 146 from an adjacent feature 78 of the first characteristic may be greater than a second casing thickness 98, radial height 122, axial width 142, internal angle, and/or axial separation 148 from an adjacent feature 78 of the second characteristic. However, in other embodiments, at least one second characteristic may be greater than at least one of the first characteristics. For instance, the second axial separation 148 may be greater than the first axial separation 146. It should also be appreciated that at least one of the first characteristics of the circumferential groove 150 at the first circumferential location(s) 106 different than at least one of the second characteristics (including the casing thickness 91) may reduce or eliminate flow non-uniformities 75 (see, e.g., FIGS. 3 and 4) at the first circumferential location 106. It should further be recognized that the first characteristic(s) at the first circumferential location(s) 106 may transition to the second characteristic(s) at the second circumferential location 108. For instance, the first characteristic(s) may transition linearly or non-linearly to the second characteristic(s).

In one embodiment, the rotor blade(s) 62 and/or the outer casing 64 may include at least one of a metal, metal alloy, or composite material. For instance, the rotor blade(s) 62 may be formed at least partially from a ceramic matrix composite. For instance, the rotor blades 62 and/or outer casing 64 may be formed at least partially from a ceramic matrix composite. More particularly, in certain embodiments, the rotor blades 62 and/or outer casing 64 may be formed from one or more ceramic matrix composite prepreg plies. In another embodiment, the rotor blades 62 and/or outer casing 64 may be formed from a ceramic matrix composite woven structure (e.g., a 2D, 3D, or 2.5D woven structure). In still other embodiments, the rotor blades 62 and/or outer casing 64 may be formed at least partially from a metal, such as but not limited to, steel, titanium, aluminum, nickel, or alloys of each. For instance, in certain embodiments, the rotor blades 62 and/or outer casing 64 may be cast. Though, it should be recognized that the rotor blades 62 and/or outer casing 64 may be formed from multiple materials, such as a combination of metals, metal alloys, and/or composites. Further, in certain embodiments, the interior surface 76 of the outer casing 64 may include a spray on abradable coating.

Composite materials may include, but are not limited to, metal matrix composites (MMCs), polymer matrix composites (PMCs), or ceramic matrix composites (CMCs). Composite materials, such as may be utilized in the rotor blade(s) 62, generally comprise a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYL-RAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In certain embodiments, the thermal processing may take place in an autoclave.

Similarly, in various embodiments, PMC materials may be fabricated by impregnating a fabric or unidirectional tape with a resin (prepreg), followed by curing. For example, multiple layers of prepreg plies may be stacked to the proper thickness and orientation for the part, and then the resin may be cured and solidified to render a fiber reinforced composite part. As another example, a die may be utilized to which the uncured layers of prepreg may be stacked to form at least a portion of the composite component. The die may be either a closed configuration (e.g., compression molding) or an open configuration that utilizes vacuum bag forming. For instance, in the open configuration, the die forms one side of the blade (e.g., a pressure side or a suction side). The PMC material is placed inside of a bag and a vacuum is utilized to hold the PMC material against the die during curing. In still other embodiments, the rotor blade 62 may be at least partially formed via resin transfer molding (RTM), light resin transfer molding (LRTM), vacuum assisted resin transfer molding (VARTM), a forming process (e.g. thermoforming), or similar.

Prior to impregnation, the fabric may be referred to as a "dry" fabric and typically comprises a stack of two or more fiber layers. The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. Other embodiments may include other textile forms such as plane weave, twill, or satin.

In one embodiment, PMC materials can be produced by dispersing dry fibers into a mold, and then flowing matrix material around the reinforcement fibers. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

In general, the exemplary embodiments of the rotor blades 62 and/or outer casing 64 described herein may be manufactured or formed using any suitable process. However, in accordance with several aspects of the present subject matter, the rotor blades 62 and/or outer casing 64 may be formed using an additive-manufacturing process, such as a 3D printing process. The use of such a process may allow the rotor blades 62 and/or outer casing 64 to be formed integrally, as a single monolithic component, or as any suitable number of sub-components. In particular, at least one feature 78 may be formed in the outer casing 64 via an additive-manufacturing process. Forming the feature(s) 78 via additive manufacturing may allow the feature(s) 78 to be integrally formed and include a variety of characteristics not possible when using prior manufacturing methods. For example, the additive manufacturing methods described herein enable the manufacture of feature(s) 78 having any suitable size and shape with one or more configurations, some of these novel features are described herein.

As used herein, the terms "additively manufactured," "additive manufacturing techniques or processes," or the like refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based super alloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the rotor blades 62, outer casing 64, and/or internal or external passageways such as the features 78, openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together forms the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as needed depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

While the present disclosure is not limited to the use of additive manufacturing to form these components generally, additive manufacturing does provide a variety of manufacturing advantages, including ease of manufacturing, reduced cost, greater accuracy, etc. In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above may enable much more complex and intricate shapes and contours of the outer casing 64 described herein. For example, such components may include thin additively manufactured layers and unique fluid passageways or cavities, such as the features 78. In addition, the additive manufacturing process enables the manufacture of a single component having different materials such that different portions of the component may exhibit different performance characteristics. The successive, additive nature of the manufacturing process enables the construction of these novel features. As a result, the rotary component 61 described herein may exhibit improved performance and reliability.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotary component for a gas turbine engine defining a central axis extending along an axial direction, a radial direction extending perpendicular to the axial direction, and a circumferential direction perpendicular to both the central axis and the radial direction, the rotary component comprising:
- a plurality of rotor blades operably coupled to a rotating shaft extending along the central axis; and
- an outer casing arranged exterior to the plurality of rotor blades in the radial direction,
- wherein the outer casing defines an annular gap between a tip of each of the plurality of rotor blades and the outer casing,
- wherein the outer casing comprises a first portion and a second portion,
- wherein a first feature is formed at the first portion of the outer casing and extends from a first interior radial surface of the outer casing towards a first outer radial surface of the outer casing,
- wherein the first portion of the outer casing has a first casing thickness defined from the first interior radial surface to the first outer radial surface,
- wherein a second feature is formed at a second portion of the outer casing and extends from a second interior radial surface of the outer casing towards a second outer radial surface of the outer casing,
- wherein the second portion is offset at least partially circumferentially or axially from the first portion,
- wherein the second portion of the outer casing has a second casing thickness defined from the second interior radial surface to the second outer radial surface, and
- wherein the second casing thickness is different than the first casing thickness.

2. The rotary component of claim 1, wherein the first and second features each comprise an axial slot or a circumferential groove.

3. The rotary component of claim 1,
- wherein the first casing thickness is greater than the second casing thickness, and
- wherein the first casing thickness is positioned at location of a first distortion level on the first interior radial surface of the outer casing and the second casing thickness is positioned at a location of a second distortion level less than the first distortion level.

4. The rotary component of claim 1,
- wherein the first feature further defines a first characteristic, and
- wherein the second feature further defines a second characteristic, the first characteristic different than the second characteristic.

5. The rotary component of claim 4, wherein the first and second characteristics each comprise at least one of a radial height, axial dimension, circumferential dimension, separation from an adjacent feature, or internal angle for each of the first and second features.

6. The rotary component of claim 4,
- wherein the first feature is a first circumferential groove at a first axial location,
- wherein the second feature is a second circumferential groove at a second axial location positioned downstream of the first axial location, and
- wherein the first and second characteristics each comprise at least one of a radial height, circumferential length, or axial width.

7. The rotary component of claim 6, wherein at least one of a first radial height, first circumferential length, or first axial width of the first characteristic is greater than at least one of a second radial height, second circumferential length, or second axial width of the second characteristic.

8. The rotary component of claim 4,
- wherein the first feature is a first axial slot at a first circumferential location,
- wherein the second feature is a second axial slot at a second circumferential location, and
- wherein the first and second characteristics each comprise at least one of a radial height, circumferential width, orientation, or axial length.

9. The rotary component of claim 8, wherein the first casing thickness is greater than the second casing thickness.

10. The rotary component of claim 9, wherein a first separation from an adjacent feature of the first characteristic is less than a second separation from an adjacent feature of the second characteristic.

11. The rotary component of claim 9, wherein at least one of a first radial height, circumferential width, orientation, or axial length of the first characteristic is greater than at least one of a second radial height, circumferential width, orientation, or axial length of the second characteristic.

12. The rotary component of claim 1,
- wherein each of the first and second features is positioned radially outward from at least one rotor blade of the plurality of rotor blades, and
- wherein each of the first and second features is positioned axially between a leading edge and a trailing edge of the at least one rotor blade.

13. The rotary component of claim 1,
- wherein at least one of the first and second features is positioned at least partially radially outward from at least one rotor blade of the plurality of rotor blades, and
- wherein the at least one of the first and second features is positioned at least partially axially forward of a leading edge or at least partially axially rearward of trailing edge of the at least one rotor blade.

14. The rotary component of claim 1, wherein the rotary component is a fan section or a compressor of the gas turbine engine, and wherein the plurality of rotor blades comprises a plurality of fan blades or a plurality of compressor blades, respectively.

15. A rotary component for a gas turbine engine defining a central axis extending along an axial direction, a radial direction extending perpendicular to the axial direction, and a circumferential direction perpendicular to both the central axis and the radial direction, the rotary component comprising:
- a plurality of rotor blades operably coupled to a rotating shaft extending along the central axis; and
- an outer casing arranged exterior to the plurality of rotor blades in the radial direction,
- wherein the outer casing defines an annular gap between a tip of each of the plurality of rotor blades and the outer casing,
- wherein the outer casing comprises a first portion and a second portion,
- wherein a first feature is formed at the first portion of the outer casing and extends from a first interior radial surface of the outer casing towards a first outer radial surface of the outer casing, wherein the first portion of the outer casing has a first casing thickness defined from the first interior radial surface to the first outer radial surface, wherein a second feature is formed at a second portion of the outer casing and extends from a second interior radial surface of the outer casing towards a second outer radial surface of the outer casing, wherein the second portion is offset at least partially circumferentially or axially from the first portion, wherein the second portion of the outer casing has a second casing thickness defined from the second interior radial surface to the second outer radial surface, wherein the second casing thickness is different than the first casing thickness, wherein the first feature comprises a first circumferential groove extending along the circumferential direction defining a first characteristic at a first circumferential position, wherein the second feature comprises a second circumferential groove extending along the circumferential direction defining a second characteristic at a second circumferential position, and wherein the first characteristic is different than the second characteristic.

16. The rotary component of claim 15, wherein the first and second characteristics each comprise at least one of a casing thickness, radial height, axial width, separation from an adjacent feature, or an internal angle.

17. The rotary component of claim 16, wherein the first casing thickness is greater than the second casing thickness, wherein the first characteristic is positioned at a location of a first distortion level on the interior surface of the outer casing, and wherein the second characteristic is positioned at a location of a second distortion level on the interior surface of the outer casing less than the first distortion level.

18. The rotary component of claim 15, wherein one of the first and second circumferential grooves is positioned radially outward from one rotor blade of the plurality of rotor blades, and wherein the one of the first and second circumferential grooves is positioned axially between a leading edge and a trailing edge of the rotor blade.

19. The rotary component of claim 15, wherein one of the first and second circumferential groove is positioned at least partially radially outward from one rotor blade of the plurality of rotor blades, and wherein the one of the first and second circumferential grooves is positioned at least partially axially forward of a leading edge or at least partially axially rearward of a trailing edge of the rotor blade.

20. The rotary component of claim 15, wherein the rotary component is a fan section or a compressor of the gas turbine engine, and wherein the plurality of rotor blades comprises a plurality of fan blades or a plurality of compressor blades, respectively.

* * * * *